(12) United States Patent
Houg

(10) Patent No.: US 6,324,596 B1
(45) Date of Patent: *Nov. 27, 2001

(54) PROVIDING DEVICE STATUS DURING BUS RETRY OPERATIONS

(75) Inventor: Todd C. Houg, St. Francis, MN (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 09/201,550

(22) Filed: Nov. 30, 1998

(51) Int. Cl.[7] .................. G06F 13/14; G06F 13/20
(52) U.S. Cl. .................. 710/19; 710/15; 710/58
(58) Field of Search ................ 710/1, 19, 15, 710/58

(56) References Cited

U.S. PATENT DOCUMENTS

| | | | |
|---|---|---|---|
| 5,375,225 | * 12/1994 | Dean et al. | 395/500 |
| 5,717,872 | * 2/1998 | Whittaker | 395/285 |
| 5,790,813 | * 8/1998 | Whittaker | 395/293 |
| 5,815,647 | * 9/1998 | Buckland et al. | 395/182.01 |
| 5,923,856 | 7/1999 | Hazama et al. | 395/281 |
| 5,940,234 | * 8/1999 | Wilson et al. | 360/53 |
| 5,941,964 | 8/1999 | Young et al. | 710/100 |
| 6,040,832 | 3/2000 | Poreh et al. | 345/340 |

FOREIGN PATENT DOCUMENTS

| | | | |
|---|---|---|---|
| 62-40557 | * 2/1987 | (JP). | |
| 407271623A | * 10/1995 | (JP) | G06F/11/14 |

* cited by examiner

Primary Examiner—Thomas Lee
Assistant Examiner—Rehana Perveen
(74) Attorney, Agent, or Firm—Trop, Pruner & Hu, P.C.

(57) ABSTRACT

A technique to provide device status information includes obtaining device status information, determining when a bus retry operation is being executed, and routing the device status information to a bus if a bus retry operation is being executed.

22 Claims, 5 Drawing Sheets

PROVIDING DEVICE STATUS DURING BUS RETRY OPERATIONS

BACKGROUND

The invention relates to computer system bus interfaces and, more particularly, to a mechanism for providing device status information during some types of bus read transactions.

Many current computer systems are designed around standard bus architectures such as the Peripheral Component Interface (PCI) standard. (See the "PCI Local Bus Specification, revision 2.1," available from the PCI Special Interest Group of Hillsboro, Oreg.). Selection of a bus architecture is tantamount to specifying a communication protocol by which disparate devices within the computer system are allowed to communicate.

In a PCI bus computer system, devices may be targets, initiators, or both targets and initiators. Initiators typically initiate bus transactions (e.g., read and write operations), while targets respond to initiator device initiated transactions. (For clarity, bus transactions are referenced from a initiator device's point of view. Thus, a read transaction signifies an initiator device is requesting data from a target device. Conversely, a write transaction signifies an initiator device is attempting to transfer data to a target device.)

Table 1 describes some of the bus transaction control signals used in a 32-bit PCI based computer system. Generally, an initiator initiates a bus transaction by asserting the FRAME# signal and then placing an address on the AD bus. The first rising clock edge after the FRAME# signal is asserted completes the address phase. Following the address phase, the first of one or more data phases begins during which data is transferred between initiator and target on each rising clock edge in which both the IRDY# and TRDY# signals are simultaneously asserted. Wait cycles may be inserted in a data phase by either the initiator device or the target device by deasserting the IRDY# or TRDY# signals respectively.

TABLE 1

Some PCI Bus Transaction Signals

| Signal | Description |
|---|---|
| CLK | Clock provides timing for PCI transactions and is an input to all PCI devices. All of the following signals are sampled on the rising edge of CLK. Current PCI buses may operate at a clock of 33 or 66 megahertz (MHz). |
| AD[31::0] | Address and Data are multiplexed on the same PCI bus lines. A bus transaction consists of an address phase followed by one or more data phases. This collection of bus lines constitute the address/data bus, or AD bus. |
| FRAME# | Cycle Frame is driven by the current bus initiator to indicate the beginning and duration of a transaction. |
| IRDY# | Initiator Ready indicates the current bus initiator is ready and able to complete a data phase of the current transaction. During a read transaction, IRDY# indicates the initiator is prepared to accept data. During a write transaction, IRDY# indicates that valid data is present on AD[31::0]. |
| TRDY# | Target Ready indicates the target is ready and able to complete a data phase of the current transaction. During a read transaction, TRDY# indicates that valid data is present on AD[31::0]. During a write transaction, TRDY# indicates the target is prepared to accept data. |
| STOP# | Stop indicates the current target is requesting the current initiator to stop the current transaction. |
| DEVSEL# | Device Select indicates a device has decoded its address as the target of the current transaction |

TABLE 1-continued

Some PCI Bus Transaction Signals

| Signal | Description |
|---|---|

Note: In accordance with the PCI specification, the symbol '#' denotes a signal that is active (asserted) at a low logic level.

The timing diagram for a basic PCI read transaction is shown in FIG. 1. As indicated above, read transaction 100 begins with address phase 102 which, in turn, follows assertion of FRAME# signal 104 by the initiator device. During address phase 102 the AD bus (i.e., signals AD[31::0] 106) contains the address of the initiator device's intended target device. The initiator device indicates it is able to accept data from the target device by asserting IRDY# signal 108. Following address phase 102, the PCI specification requires turnaround cycle 110 during which the AD bus is not driven (this ensures the AD bus is not driven by both an initiator and target device at the same time).

The first rising clock edge following address phase 102 begins data phase 1 112. In accordance with the PCI specification, the target device drives the AD bus following turnaround cycle 110 when DEVSEL# signal 114 is asserted—in this instance, following the rising edge of clock 3. The target must continue to drive the AD bus until the transaction completes (i.e., when the initiator deasserts FRAME# signal 104 following clock 7). Following assertion of DEVSEL# 114 and TRDY# 116 signals, data is transferred on each rising clock edge when both IRDY# 108 and TRDY# 116 signals are asserted, for example, on rising clock edges 4, 6, and 8. On the other hand, if either IRDY# 108 or TRDY# 116 signals are deasserted, a wait cycle is inserted into read transaction 100 and no data is transferred. For example, wait cycles may be inserted during clock cycles 3, 5, and 7.

The initiator knows that the final data will be transferred during data phase 3 118 and so can deassert FRAME# signal 104 following data phase 2's 120 data transfer. On completion of read transaction 100, the initiator may place the PCI bus in an idle state by ensuring that both FRAME# 104 and IRDY# 108 signals are deasserted at the same time (not necessarily simultaneously), for example following data phase 3 118.

In a PCI environment, either an initiator or target device may terminate a bus transaction. Initiator device terminated transactions are referred to as completion and timeout transactions. Target device terminated transactions are referred to as disconnect, target-abort, and retry transactions.

A retry transaction refers to the termination of a read transaction before any data is transferred. Consequently, retry transactions may indicate that a target device is creating a data transfer bottleneck thereby reducing a computer system's effective operating speed. Alternatively, retry transactions may indicate a delayed read or transaction ordering operations. It is generally not possible to accurately determine what is causing a retry transaction. That is, internal target device status information is typically opaque to other bus devices.

Thus, there is a need for a mechanism that a target device causing a retry transaction may use to provide information regarding the target's status without further impeding ongoing data transfer operations. The supplied information may, for example, be used to determine the cause of the retry operations.

SUMMARY

In one embodiment, the invention provides a method to provide device status information. The method includes obtaining status information for a device, indicating a bus retry operation, and routing the device status information to an output circuit based on the indication.

DETAILED DESCRIPTION

Techniques (including methods and devices) to provide device status information during some types of bus transactions are described. While the following embodiments of this inventive concept are described in terms of a Peripheral Component Interface (PCI) based computer system, the invention is not so limited. Generally, the invention is applicable to any communication protocol in which a device drives a bus (e.g., a data bus) during a time in which the content of the information placed on the bus is not defined.

Figure 1:
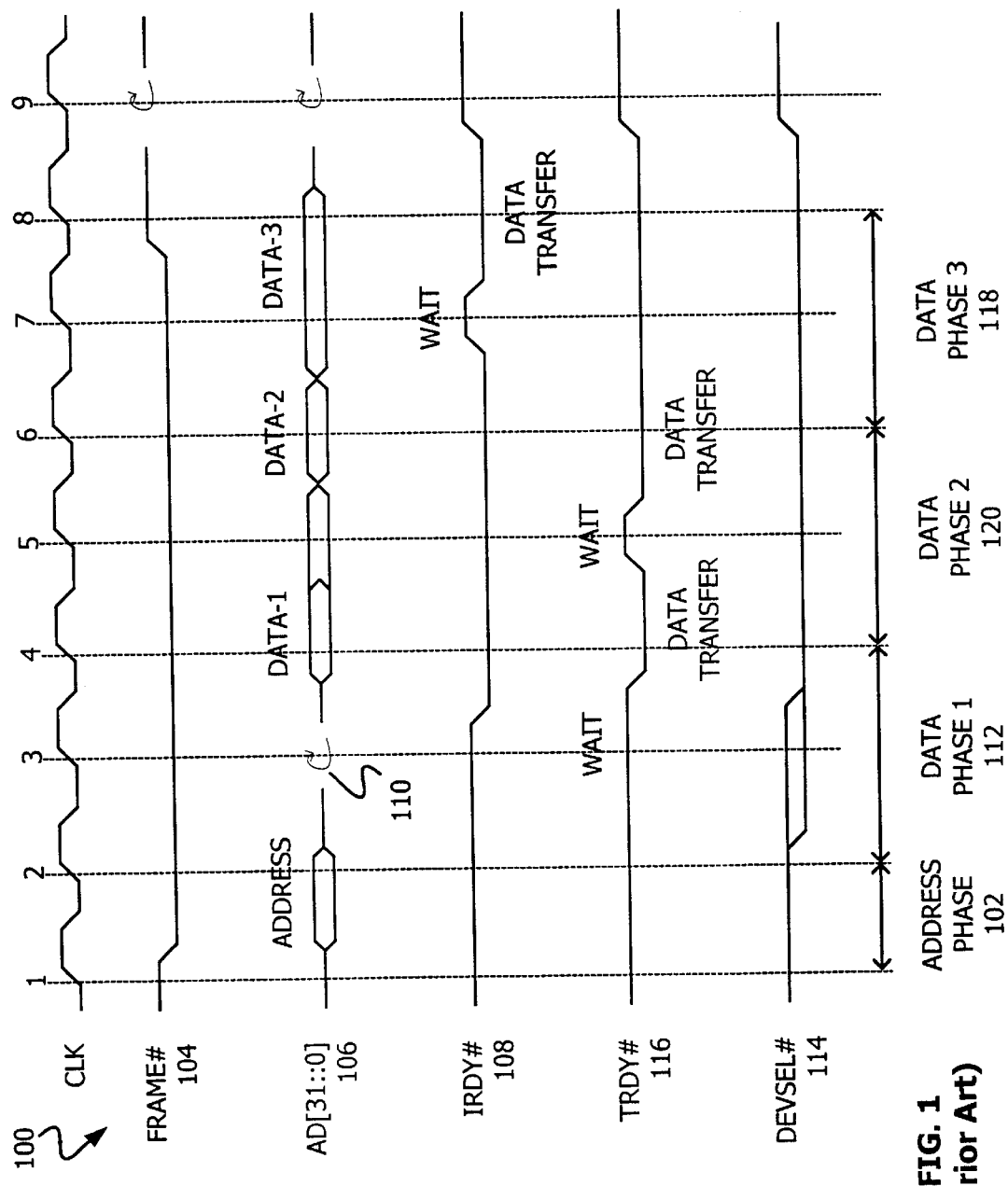
FIG. 1 shows a timing diagram for a basic PCI read transaction.
Figure 2:
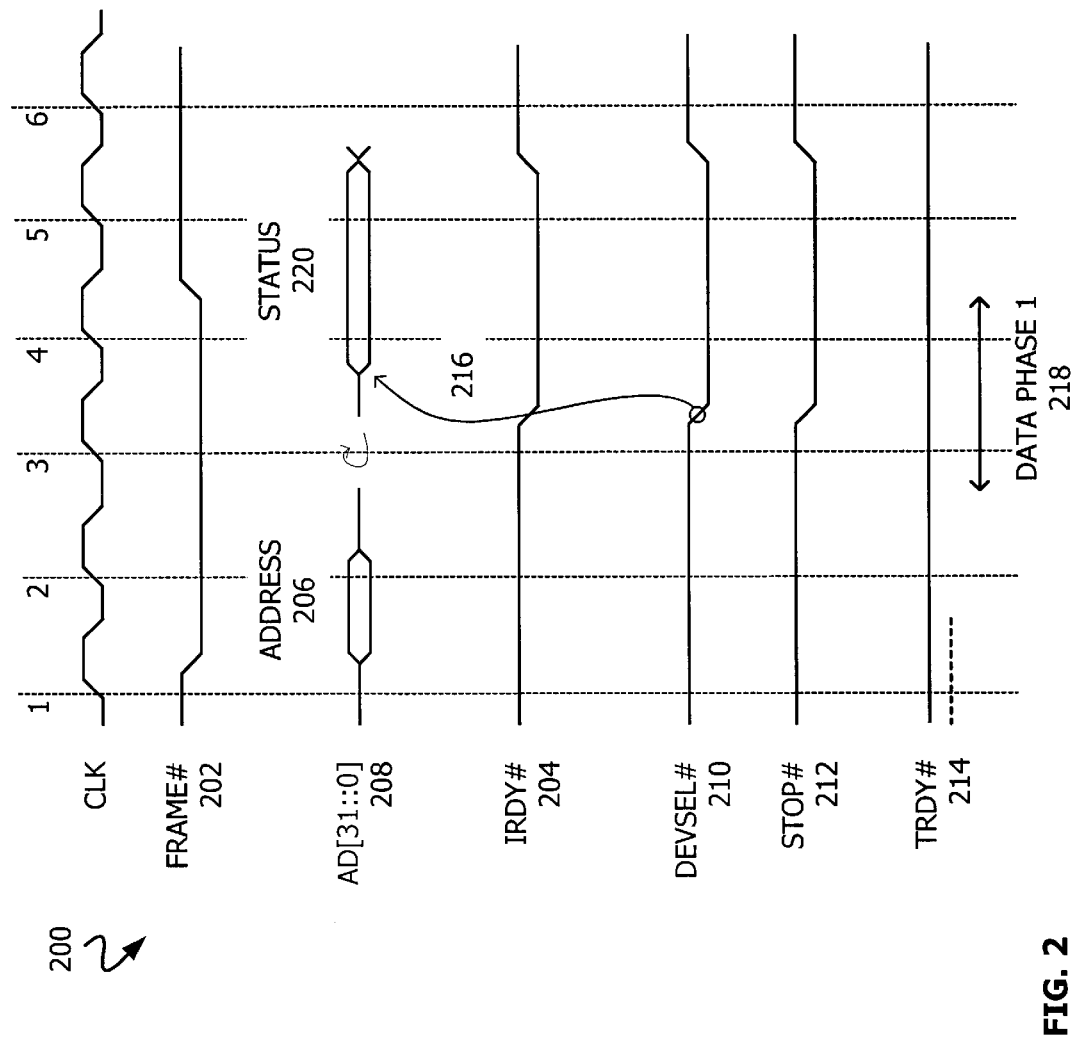
FIG. 2 shows a timing diagram for a retry transaction in accordance with the invention.

A timing diagram for a retry transaction in accordance with one embodiment of the invention is shown in FIG. 2. As in a basic read operation (see, for example, FIG. 1), retry transaction 200 begins when FRAME# signal 202 is asserted during clock 2 and IRDY# signal 204 is asserted during clock 4. The target device claims the transaction by decoding address 206 from the AD bus 208 (i.e., signals AD[31::0]) and asserting DEVSEL# signal 210 during clock 4. Because this is a retry transaction, the target device indicates it cannot complete the initiator device's request by asserting STOP# signal 212 during clock 4 while keeping TRDY# signal 214 deasserted.

Data phase 1 218 completes on clock 4 because both IRDY# 204 and STOP# 212 signals are asserted. No data was transferred during this time however because TRDY# signal 214 is deasserted. In addition, because STOP# signal 212 is asserted and TRDY# signal 214 was deasserted on clock 4, the initiator device knows the target device is unable to transfer any data for this transaction (that is, the initiator determines this is a retry type of bus transaction). In accordance with the PCI specification, the initiator device is required to deassert FRAME# signal 202 as soon as IRDY# signal 204 may be asserted. In the example transaction of FIG. 2, FRAME# signal 202 may be deasserted on clock 5 because IRDY# signal 204 is asserted on clock 5. On completion of the (terminated) transaction—at clock 6—target device may deassert DEVSEL# 210 and STOP# 212 signals.

As illustrated in FIG. 2 and discussed above, the PCI specification requires the target device to drive AD bus 208 one clock cycle after asserting DEVSEL# signal 210 (indicated by arrow 216). This is true even through the target has no meaningful data to transfer (that is, the semantic content of AD bus 208 during this period is undefined). Conventional target devices may, for example, provide whatever data pattern is present in their data output buffers (typically, the last data pattern/value transferred from the target device).

In contrast, a device in accordance with one embodiment of the invention may drive AD bus 208 with status information 220 during data phase 1 218. For example, a target device may provide indication of the status of its input and/or output buffers such as, for example, whether the buffers are empty, half-full, or full. Additional status information that may be placed on AD bus 208 during data phase 218 includes whether the target device has a delayed read pending, the identity of the initiator associated with the delayed read, which initiator devices may be masked off by the target device, and error reporting information (e.g., processor or processor bus errors and memory system faults). In addition to providing status information, target devices may also provide configuration information during data phase 1 218. This information may be of the type that is typically obtained through standard access of the target device's configuration space. Illustrative device status information includes the device's base address, vendor identification, master status, and which operational (e.g., PCI) features are enabled. In a 32-bit PCI bus system, each target device may provide up to 32 bits of status/configuration information in accordance with the invention. In a 64-bit PCI bus system, each target device may provide up to 64 bits of information.

Figure 3:
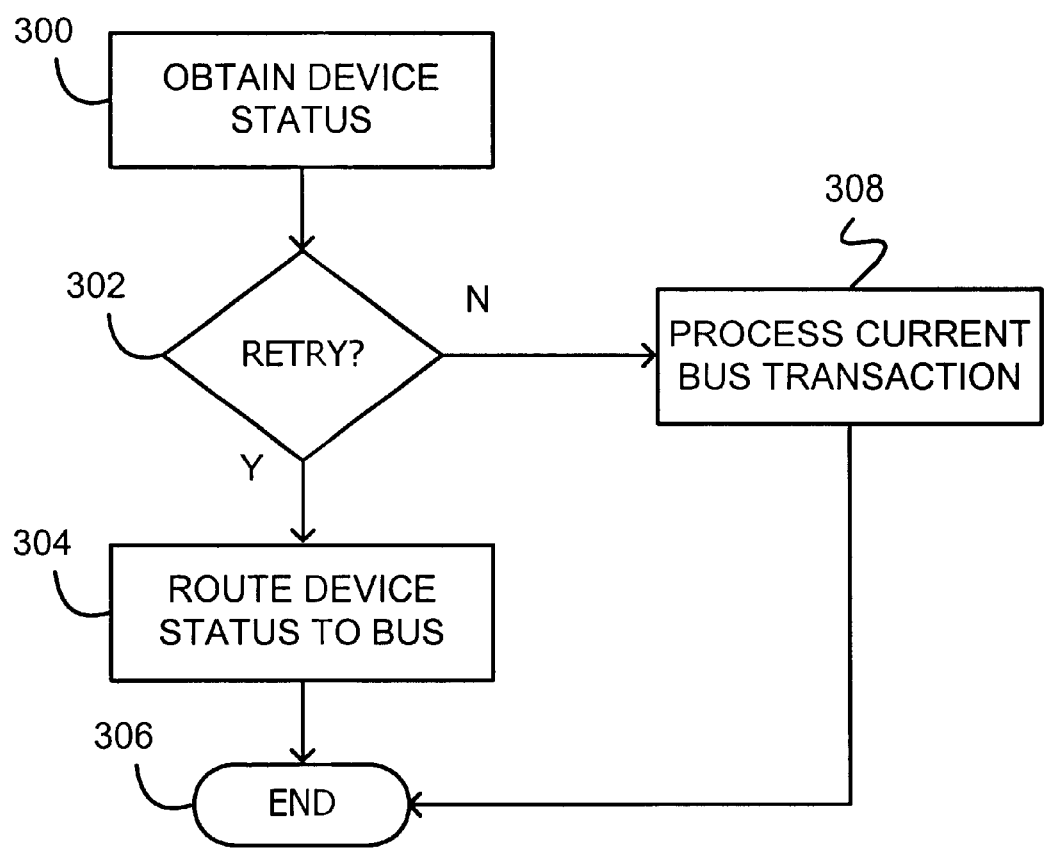
FIG. 3 illustrates a method in accordance with one embodiment of the invention.

FIG. 3 illustrates a method in accordance with one embodiment of the invention. Status information may be obtained during normal device operations and recorded in, for example, a 32 bit or 64 bit register (block 300). If the current operation is a bus retry transaction (the 'yes' prong of diamond 302), the recorded status information may be selectively routed to the bus during, for example, data phase 1 218 (block 304). (In practice, the acts of blocks 300 and 302 may be reversed in sequence.) Following deassertion of FRAME# 202, DEVSEL# 210, and STOP# 212 signals, retry transaction processing terminates (block 306). If the current operation is not a bus retry transaction (the 'no' prong of diamond 302), the current bus transaction is completed (block 308). For example, the current bus transaction may be a basic PCI read operation as illustrated in FIG. 1.

Figure 4:
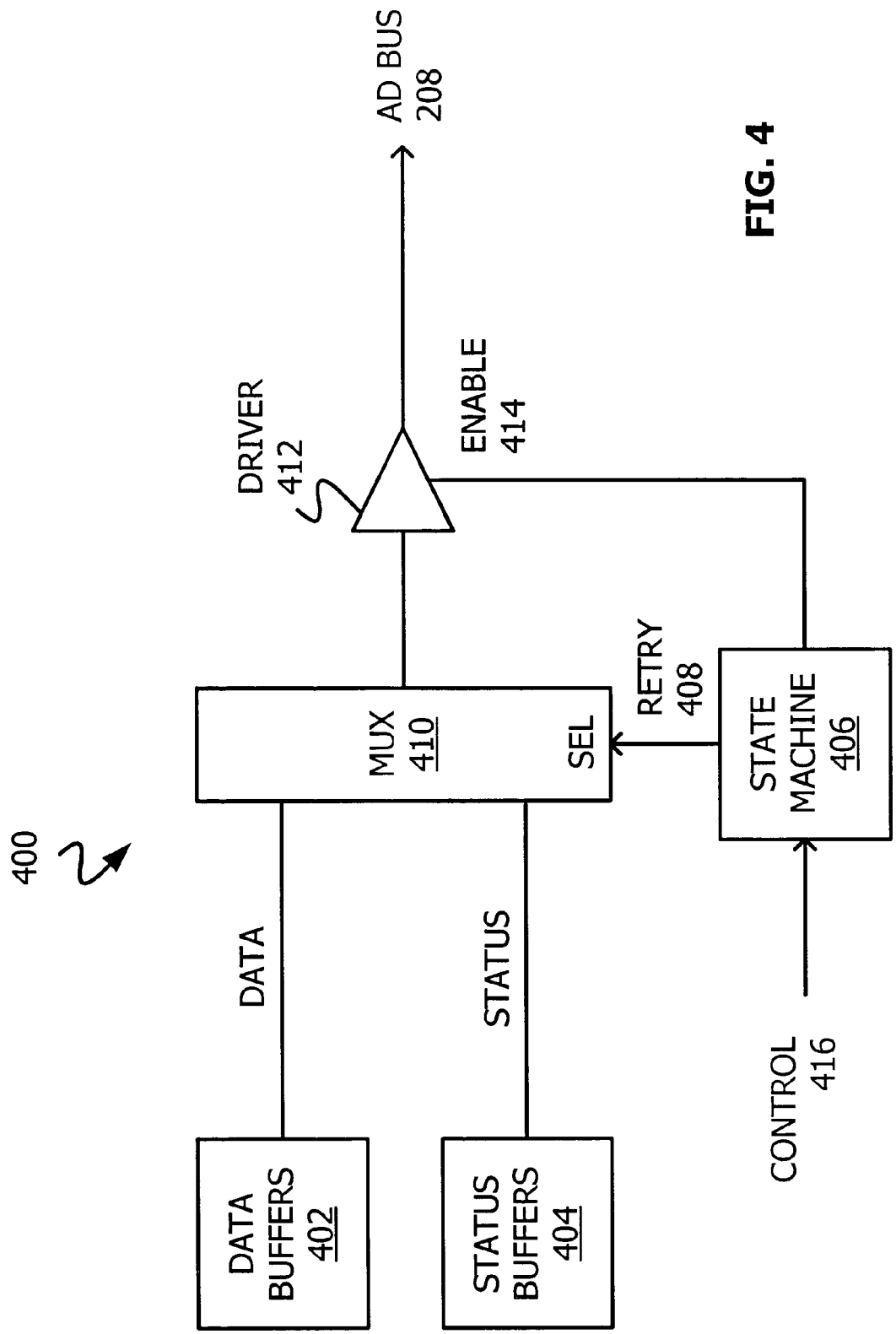
FIG. 4 shows a target device in accordance with one embodiment of the invention.

Referring to FIG. 4, target device 400 may be used to provide status and/or configuration information in accordance with one embodiment of the invention. Data buffers 402 may be used to record (temporarily store) target device data patterns that are directed to or from AD bus 208 during conventional read and write transactions such as the basic PCI read transaction illustrated in FIG. 1. Status buffers 404 may be used to capture or record target device status information of the type described above. State machine 406 may conform to the requirements of the PCI specification with the additional capability of generating RETRY signal 408. AD bus multiplexer (MUX) 410 routes data buffer 402 or status buffer 404 output to driver 412. When enabled (via ENABLE signal 414), driver drives its input data signals onto AD bus 208.

State machine 406 may assert RETRY signal 408 to route the contents of status buffers 404 to driver 412 within one clock cycle of asserting DEVSEL# signal 210 when executing a retry transaction. Control signal input 416 (e.g., indication of whether a delayed transaction, transaction ordering, or data buffer 402 input registers —typically referred to a first-in/first-out or FIFO registers—are full such that the requested operation can not be immediately processed) may be used by state machine 406 to determine when a retry transaction is being performed. When RETRY signal 408 is not asserted, the contents of data buffers 402 may be routed through MUX 410 to driver 412.

Figure 5:
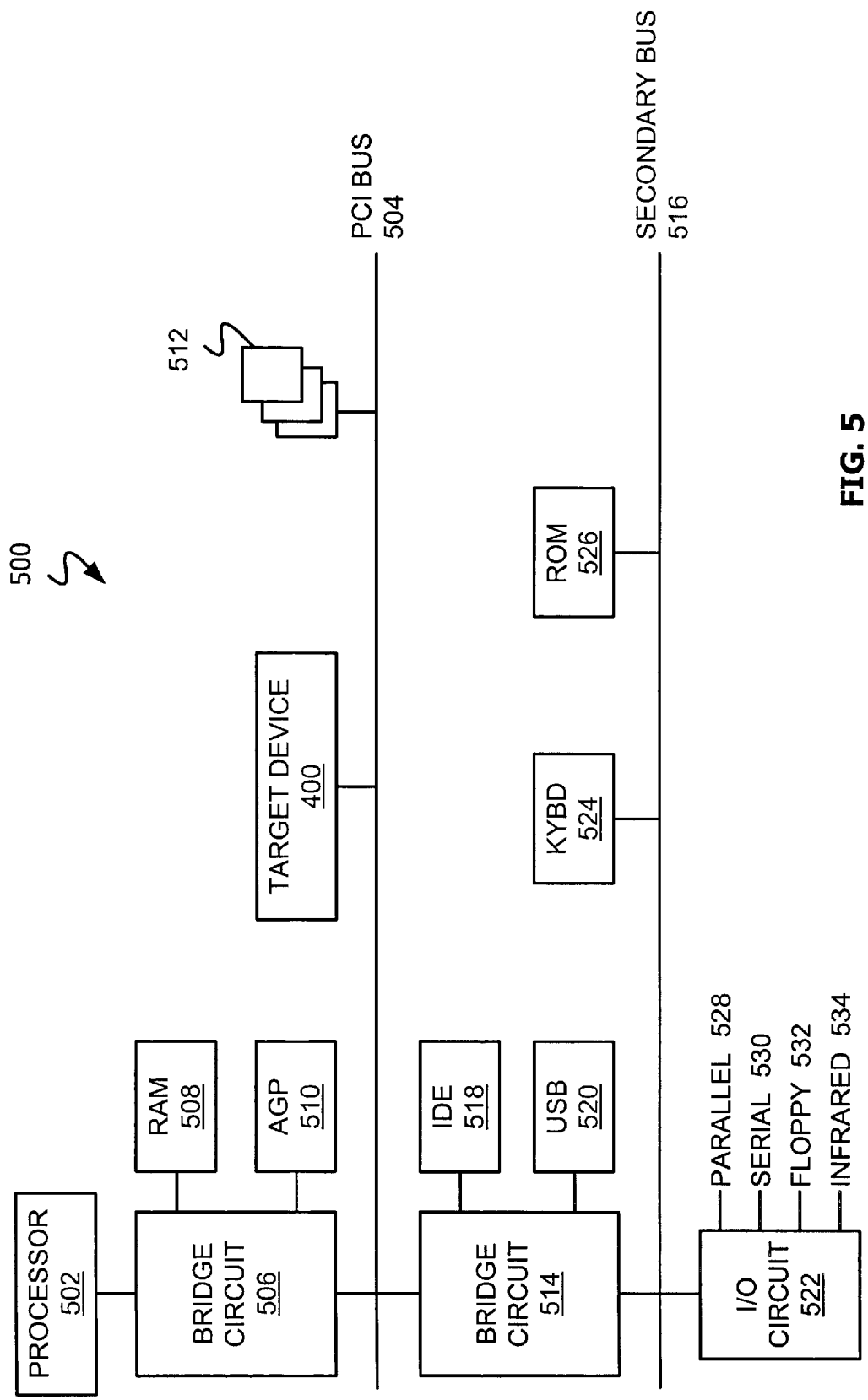
FIG. 5 shows a computer system in accordance with one embodiment of the invention.

Referring to FIG. 5, an illustrative computer system 500 having a target device 400 in accordance with FIG. 4 is shown. Computer system 500 includes processor 502 coupled to PCI bus 504 through bridge circuit 506. Processor 502 may be a general purpose processor such as a microprocessor, or a special purpose processor such as a digital signal processor or microcontroller.

Bridge circuit 506 typically provides an interface to system random access memory (RAM) 508 and accelerated graphics port (AGP) device 510. Target device 400, and possibly other PCI devices 512, may be coupled to PCI bus 504. Bridge circuit 506 typically comprises both target and initiator devices.

Bridge circuit 514 may couple PCI bus 504 to secondary bus 516, while also providing interfaces to integrated device electronics (IDE) device 518 and universal serial bus (USB) device 520. Input-output (I/O) circuit 522, keyboard controller (KYBD) 524, and system read only memory (ROM) 526 may also be coupled to secondary bus 516. Input-output circuit 522 may provide an interface for parallel 528 and serial 530 ports, floppy disks 532, and infrared devices 534.

Benefits of the inventive technique include improved diagnostic capability during computer system design. Status information provided in accordance with the invention may also aid in the post-hoc as well as operational evaluation of a PCI based system (e.g., during maintenance operations). In addition, a PCI bus device may be used to capture status and/or configuration information placed on the PCI bus by a target device for later review.

While the invention has been disclosed with respect to a limited number of embodiments, numerous modifications and variations will be appreciated by those skilled in the art. It is intended, therefore, that the following claims cover all such modifications and variations that may fall within the true sprit and scope of the invention. For example, various changes in the materials, components, and circuit elements are possible without departing from the scope of the claims. For instance, the illustrative target device of FIG. 4 may be embodied in a hardware device such as a printed circuit board comprising discrete logic, integrated circuits, or specially designed application specific integrated circuits (ASICs).

What is claimed is:

1. A method, comprising:

obtaining indication of a status of a device;

indicating a bus retry operation; and routing the indication of the device status to an output circuit in response to indicating the bus retry operation.

2. The method of claim 1, further comprising:

obtaining a data pattern associated with the device; and routing the data pattern to the output circuit if the indication does not indicate a bus retry operation.

3. The method of claim 1, wherein indicating the bus retry operation comprises indicating a peripheral component interface bus retry transaction.

4. The method of claim 1, wherein obtaining the indication of the status comprises obtaining an indication of a pending delayed read operation.

5. The method of claim 1, wherein obtaining indication of the status comprises obtaining an indication of memory system faults.

6. The method of claim 1, wherein obtaining the indication of the status comprises obtaining an indication of one or more configuration space parameters of the device.

7. A method, comprising:

storing status information in a target device;

providing a request to the target device; and providing the status information from the target device in response to determining that the request may not be completed by the target device.

8. The method of claim 7, further comprising sending an indication that the request may not be completed by the target device.

9. The method of claim 7, wherein storing the status information comprises storing an indication of a pending delayed read operation.

10. The method of claim 7, wherein storing the status information comprises storing error reporting information.

11. The method of claim 7, wherein storing the status information comprises storing indication of one or more configuration space parameters of the target device.

12. The method of claim 7, wherein providing a request comprises performing a read transaction to access information from the target device.

13. The method of claim 7, wherein providing the status information comprises providing the status information during a bus retry operation.

14. The method of claim 7, wherein providing the status information comprises providing the status information during a peripheral component interface busy retry transaction.

15. A method, comprising:

storing status information;

receiving a bus transaction from an initiating device;

determining whether the bus transaction can be completed; and providing the status information to the initiating device in response to determining that the bus transaction may not be completed.

16. The method of claim 15, further comprising sending an indication that the request may not be completed by the target device.

17. The method of claim 15, wherein providing the status information comprises providing the status information during a bus retry operation.

18. The method of claim 15, wherein storing the status information comprises storing at least one of an indication of a pending delayed read operation, error reporting information, and configuration space parameter.

19. The method of claim 15, wherein receiving the bus transaction comprising receiving a read transaction.

20. A method, comprising:

initiating a read transaction to access a target device;

receiving a bus retry transaction indication from the target device; and receiving status information from the target device in response to receiving the bus retry transaction indication.

21. The method of claim 20, wherein receiving the status information comprises receiving an indication of a pending delayed read operation.

22. A method, comprising:

storing a data pattern within a device;

storing status information within the device; and routing the status information over a bus when the device is executing a bus retry operation and routing the data pattern over the bus when the device is not executing the bus retry operation.

* * * * *